United States Patent [19]

Thorban

[11] 4,419,823
[45] Dec. 13, 1983

[54] PROGRAMMABLE BRAKING DEVICE

[75] Inventor: Gustav Thorban, Satteldorf, Fed. Rep. of Germany

[73] Assignee: Marabuwerke Erwin Martz GmbH & Co., Fed. Rep. of Germany

[21] Appl. No.: 379,780

[22] Filed: May 19, 1982

[30] Foreign Application Priority Data

Jun. 23, 1981 [DE] Fed. Rep. of Germany ....... 3124540

[51] Int. Cl.³ ............................................. B43L 13/02
[52] U.S. Cl. ..................................... 33/1 M; 33/434; 33/448
[58] Field of Search ................... 33/1 M, 1 AA, 41 B, 33/42, 430, 434, 438, 448

[56] References Cited

U.S. PATENT DOCUMENTS

| | | | |
|---|---|---|---|
| 3,567,950 | 3/1971 | Meyer | 33/1 M |
| 3,744,891 | 7/1973 | Dennis et al. | 33/1 M |
| 3,950,853 | 4/1976 | Andrew | 33/1 M |
| 4,268,969 | 5/1981 | Koenuma | 33/438 |

Primary Examiner—Willis Little
Attorney, Agent, or Firm—Fred Philpitt

[57] ABSTRACT

There is indicated a programmable braking device for the X guide block (18) and the Y guide block (30) of a drafting machine which comprises a brake band (42, 60) which is moved together with the considered guide block. The band revolves around guide pulleys (38, 40; 62, 64), which are arranged laterally outside the displacement path, and is lockable by an associated magnetic brake (44–58; 70–76). In a modified programmable braking device, the guide block (30) carrying the drafting head carries two direction brakes (130, 132) for the two co-ordinate directions. These brakes each comprise a freely running belt conveyor which is movable against the drawing surface in a friction grip.

17 Claims, 6 Drawing Figures

PROGRAMMABLE BRAKING DEVICE

The invention relates to a programmable braking device for a guide block which serves for moving the drafting head of a drafting machine in one co-ordinate direction.

A braking device of this kind is described in DE OS No. 29 52 253. Therein, the servo-brakes comprise friction elements which are mounted in the guide blocks and which, upon the excitation of associated actuating magnets, ar placed directly against the guide rails in a friction grip.

The simultaneous use of guide rails for braking is disadvantageous for various reasons in connection with drafting machines: On the one hand, rapid and abrupt braking, such as is necessary for setting the position of the guide blocks of drafting machines with a high degree of accuracy (fractions of a millimeter), causes, if used continuously, considerable wear of the braking surfaces and if these simultaneously have to perform guiding tasks the precision of guidance in the two co-ordinate directions is impaired. On the other hand, the requirements to be met for the construction of guide rails are, in general, different from those to be met for the construction of brake rails, both as regards the cross-sectional geometry and the surface quality and the condition of the material. If the same rails are used both as guide rails and as brake rails, then the two partial tasks can be only unsatisfactorily solved.

It is therefore the object of the present invention to provide a programmable braking device of the kind mentioned at the beginning where braking is effected without the aid of the guide rails for the guide blocks.

According to the invention, this problem is solved by a braking device.

Locking in the considered co-ordinate direction is effected equally well towards both sides, since only relatively short sections of the flexible draw means lie between the locking point and the fastening point on the considered guide block.

My braking device allows the deflection pulleys to be simultaneously used as reaction elements which remove the braking forces. At the same time, one obtains in this way a large braking surface while the dimensions of the individual braking units are compact.

My braking unit has a particularly simple mechanical construction. As the armature of the actuating magnet there is directly used the flexible draw means or the deflection pulley supporting it.

The further development of the invention allows the braking draw means, which, with a view to recise braking, are tightly tensioned and stretch-free, to be simultaneously used for detecting the actual position of the guide block. Coupling the angle transmitters to the axles of the deflection pulleys, which is necessary for this purpose, constitutes only a minimal additional expenditure.

In my braking device, all parts of the braking device are combined in the direct vicinity of the drafting head carrier. On the one hand, one thus obtains a very compact construction of the entire braking device; furthermore, this provides the possibility of fitting a programmable braking device on drafting machines which have already been delivered, no modifications having to be made on the precisely machined guiding devices.

My direction brake, in other words a brake which prevents the movement of the drafting head carrier in one direction only but allows it in the direction that is vertical thereto, can be realised in a particularly simple and low-cost manner.

My braking device provides a particularly large contact surface between the revolving part and the drawing surface, in other words a particularly good friction grip and a high braking power.

The further development of my invention ensures that even in the event of strong external forces being exerted in the direction of braking, the braking device will not yield along with a transversal deformation of the endless belt.

In my braking device, this high mechanical resistance in the direction of braking has been combined with a low resistance to movement in the direction that is vertical thereto.

The further development of the invention is also of advantage wit respect to a guidance of the endless belt that is free from play in the direction of braking.

A further development of the invention is of advantage with respect to a particularly simple construction of the frame adjusting drive.

My braking device provides, along with a particular compact constructional form of the frame adjusting drive, a spring bias to the position of rest.

A further development of my invention is of advantage with a view to a compact and operation-free combination of the essential parts of the programmable braking device in the direct vicinity of the drafting head.

A further development of the invention ensures, on the one hand, that the engagement of the direction brakes does not lead to any appreciable torque exertion on the guide block carrying the drafting head. Furthermore, the entire drawing surface thus remains fully utilisable.

Hereinafter, the invention will be explained in more detail with the aid of some exemplified embodiments and with reference to the accompanying drawings, in which.

Figure 1:
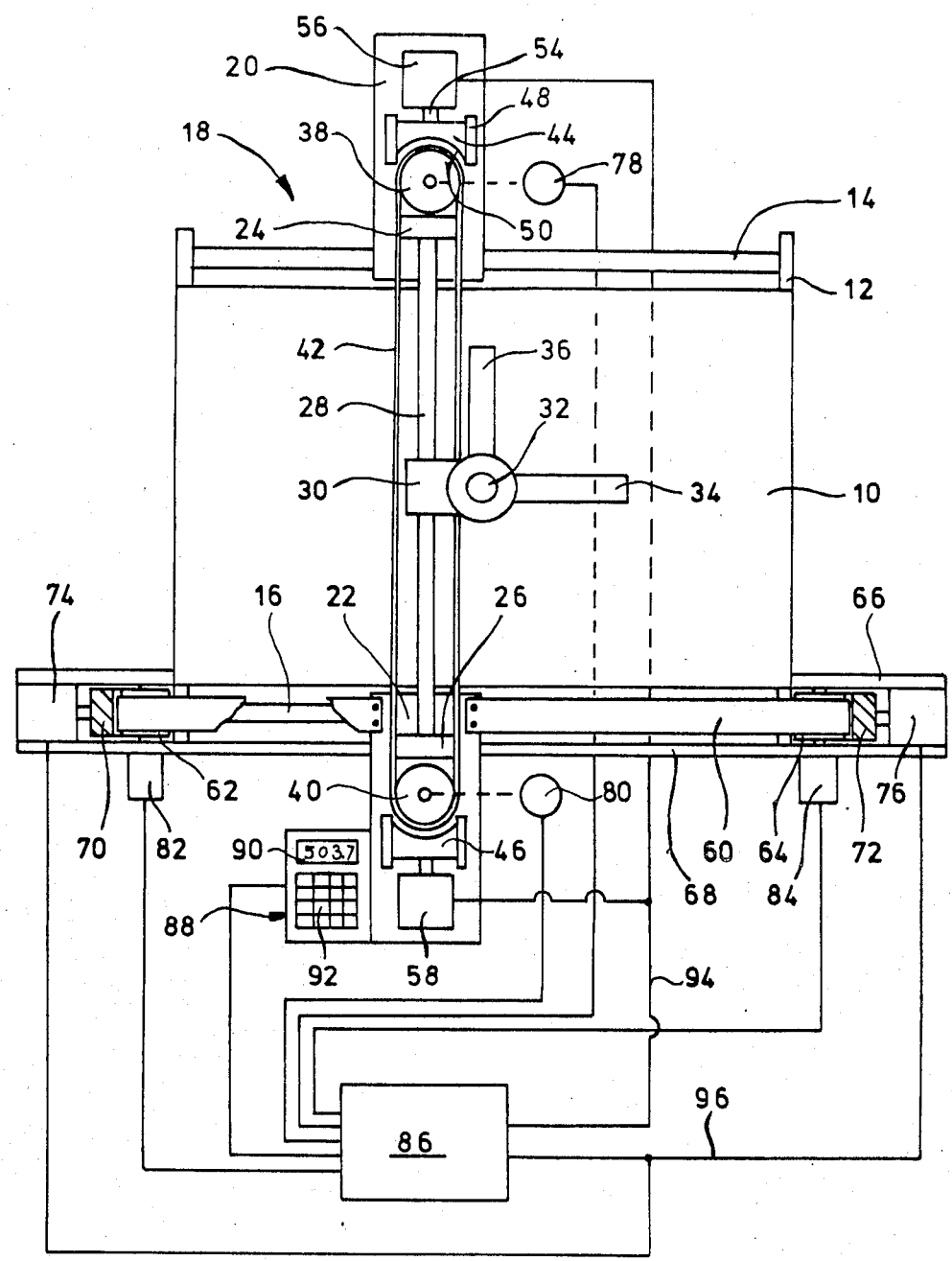
FIG. 1 shows a diagrammatical representation of a drafting machine which comprises an X guide block and a Y guide block for the drafting head and a programmable braking device for the two co-ordinate directions.

The drafting machine shown in FIG. 1 has a drawing table 10, to which the X guide rails 14 and 16 are secured via brackets 12.

An X guide block 18 comprises two block plates 20, 22 which run on the guide rails 14, 16 and, via plates 24, 26 which project to the top vertically to the table plane, carry a Y guide rail 28 and are rigidly connected together by means of the latter.

A Y guide block 30, to which a drafting head 32 is secured, runs on the Y guide rail 28. The drafting head allows the angular adjustment of two rulers 34, 36 which are vertical to each other and are secured to the head.

On the block plates 20, 22 there are mounted, so as to be rotatable about axes which are vertical to the table plane, two deflection pulleys 38, 40, over which there passes a flexible Y brake band 42 which is made of steel. The ends thereof which are to the right in FIG. 1 are fastened to the Y guide block 30. Laterally outside the deflection pulleys 38, 40 there are provided brake shoes 44, 46 which are movably guided in the Y direction, along with a slight sliding play in the X direction, by lateral guide plates 48. The brake surfaces 50 of the brake shoes 44, 46 are curved in accordance with the radius of curvature of the external surface of the brake band section that lies over the deflection pulleys 38, 40. The brake shoes 44, 46 are carried by the driven rods 54 of electromagnets 56, 58 which are also fastened on top of the block plates 20, 22.

To the block plate 22 there are secured the ends of an X brake band 60, which is also a flexible steel band. The brake band 60 revolves around deflection pulleys 62, 64 which are mounted on lateral brackets 66 and a lower cross-member 68 which, for its part, is secured to the drawing table 10. With the deflection pulleys 62 and 64 there are associated brake shoes 70, 72, the brake surfaces of which have again been adapted to the tip radius of the brake band section which passes over the deflection pulleys. The brake shoes 70, 72 can be engaged by means of electromagnets 74, 76 which are also secured to the brackets 66 and the cross-member 68, and are guided in the X direction with sliding play by lateral guide plates which correspond to the Y brake shoe guide plates 48 but have not been shown in the drawing for the sake of clarity.

The deflection pulleys 38 and 40 as well as 62 and 64 are connected to angle transmitters 78, 80, 82, 84 which are connected to associated input terminals of a computing circuit 86, as is an input unit 88 for the desired nominal position of the drafting head 32 in the X and Y directions. The input unit 88 has a display panel 90 and a key panel 92.

The computing circuit 86 determines from the output signals emitted by the angle transmitters 78, 80 and 82, 84 respectively the actual value of the drafting head position in the Y or X direction. It constantly compares these values with the nominal values input and produces on output lines 94 and 96 activating signals for the electromagnets 56, 58 and 74, 76 respectively if the actual value for the considered co-ordinate direction is equal to the nominal value.

One discerns that in the above-described programmable braking device for the guide blocks of the drafting head the guide rails associated with these are not used in any way and that the brakes proper can be optimised to optimum braking properties (rapid response, high braking power) independently of the guiding device. Furthermore, the movement of the brake bands can be simultaneously used for the reliable detection of the actual position of the drafting head in the co-ordinate directions since the brake bands 42 and 60 are very tightly tensioned. This tensioning may be effected, for example, by shifting the axle of one of the two deflection pulleys by using an eccentric sleeve or the like.

Figure 2:
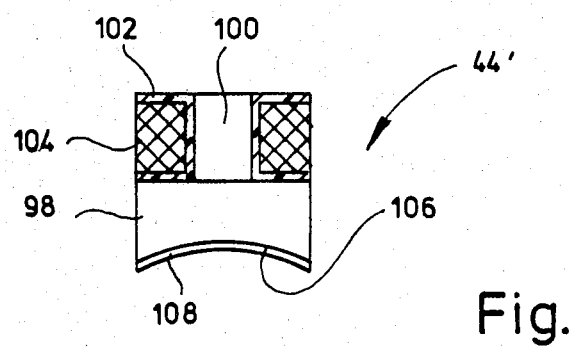
FIG. 2 shows a top view of a modified magnetic brake to be used in conjunction with the drafting machine shown in FIG. 1.

FIG. 2 shows a modified brake shoe 44' which simultaneously serves as the core of an electromagnet and is therefore made of a magnetisable material. Integrally formed with the shoe body 98 proper is a pin 100 which carries a coil form 102, on which a winding 104 has been placed. The curved front face 106 of the shoe body 98 is provided with a correspondingly curved friction lining 108.

The magnet brake shoe 44' shown in FIG. 2 can be directly inserted between the brake shoe guide plates 48 with sliding play and, upon loading of the winding 104, moves of its own accord against the associated brake band if the direct environment of the brake shoe, with which it is in sliding contact, is made of a non-magnetic material, for example aluminium, and at the same time either the brake band or the adjacent deflection pulley or both of the last-mentioned parts consist of a magnetisable material. One thus obtains a particularly compact, rugged and simple construction of the magnetic brakes.

Figure 3:
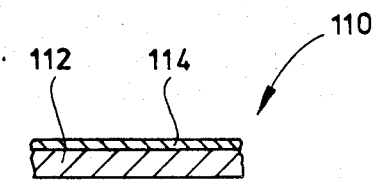
FIG. 3 shows a section through a brake band which can be used in the drafting machine shown in FIG. 1.

FIG. 3 shows a section through a specially constructed brake band 110 including a supporting band 112 which is made of a flexible steel material and is provided with a coating 114 which has good braking properties. If such a brake band is used, one obtains a good braking action even if the normal contact-pressure forces exerted by the brake shoes are minimal. The exertion of minimal normal contact-pressure forces by the brake shoes renders possible a particularly rapid response and a low energy consumption of the brakes since only little time and little energy are required for setting up the corresponding magnetic field.

Figure 4:
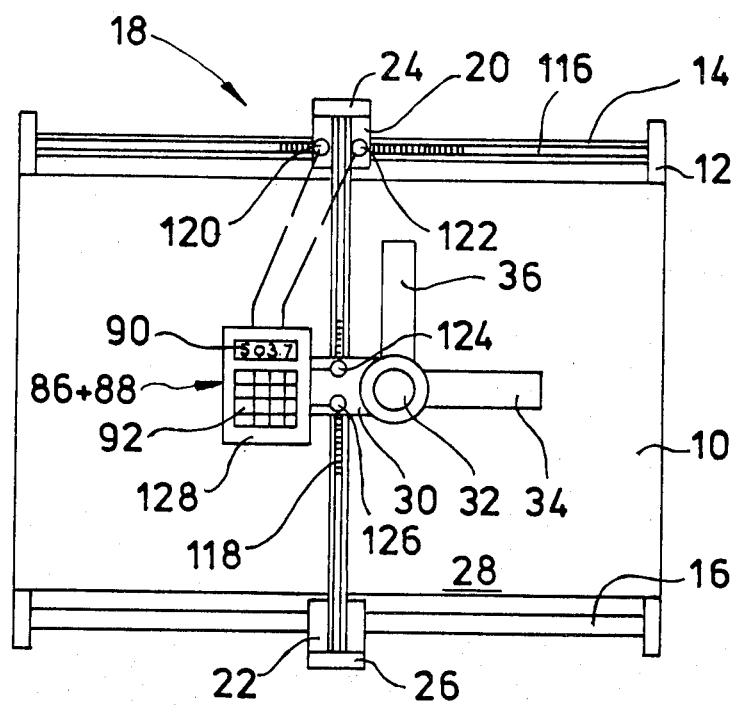
FIG. 4 shows a diagrammatical view of a modified drafting machine provided with a programmable braking device.

In a different drafting machine shown in FIG. 4, parts corresponding to the parts illustrated above with reference to FIG. 1 have been provided with the same reference symbols. There is no need to explain these parts once more at this point.

The guide rod 14 carries—for example on the bottom of a longitudinal groove—a very fine division scale 116; the guide rod 28 is provided correspondingly with a fine division scale 118. Optical pick-ups 120, 122, which are provided on the block plate 20 and work by way of reflection, respond to the passage of a division of the division scale 116 by emitting a respective pulse; optical pick-ups 124, 126, which are carried by the X guide block 30, act correspondingly when a division of the division scale 118 passes them. The output signals emitted by the pick-ups 120 to 126 pass to the computing circuit 86 which is accommodated, together with the input unit 88, in a housing 128. The latter is fixedly connected to the Y guide block 30.

Figure 5:
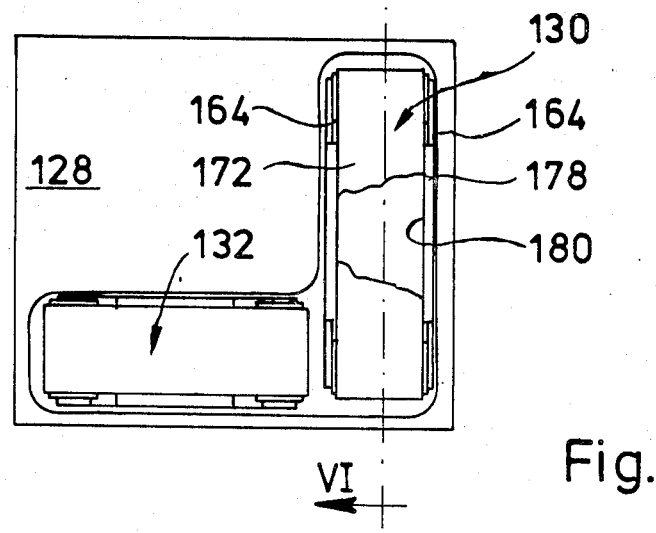
FIG. 5 shows a top view of the underside of a housing, which carries two direction brakes, of the drafting machine shown in FIG. 4.

The housing 128 simultaneously serves as the brake anchor plate for an X direction brake 13 and a Y direction brake 132 (see FIG. 5). By an X direction brake there is to be understood a brake which prevents a movement in the X direction but allows a movement in the Y direction. Conversely, a Y direction brake allows a movement in the X direction and brakes in the Y direction. Any movement of the housing 128, and consequently of the drafting head 32, is thus rendered entirely impossible by the simultaneous engagement of the X and Y direction brakes.

The X direction brake 130 and the Y direction brake 132 are similar to belt conveyers in design, but do not have any drive motors for the belts. Their identical construction will now be explained in more detail with special reference to FIG. 6.

Figure 6:
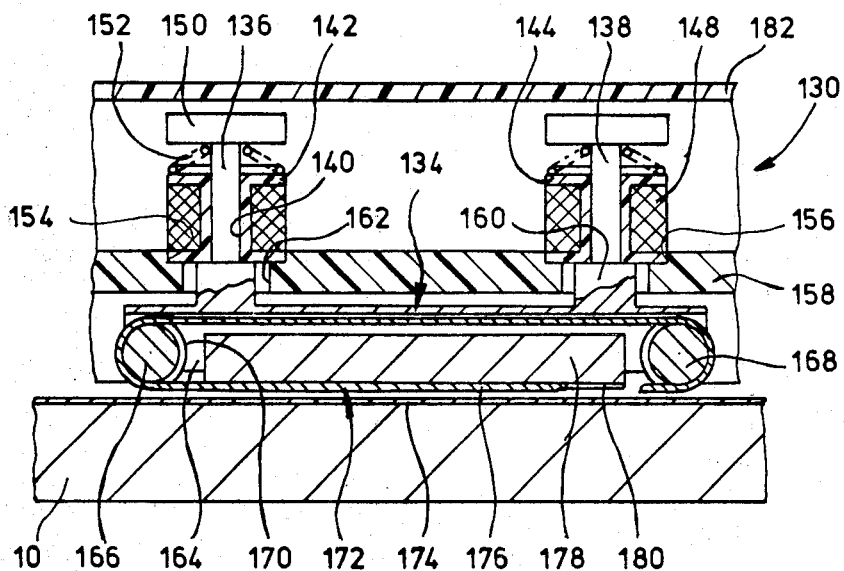
FIG. 6 shows a longitudinal section through one of the direction brakes on the housing illustrated in FIG. 5 along the line of intersection VI—VI shown therein.

The direction brakes have a frame 134 which has been extruded from a plastics material of low friction, e.g. polyamide. Integrally formed with the top of the frame 134 are two guide pins 136, 138 which are guided with sliding play in the central passages 140 of the coil forms 142, 144. The latter are also extruded from a plastics material of low friction and each carry a winding 148. The upper ends of the guide pins 136, 138 carry soft-iron armature discs 150 which are pressed, for example, on guide pin end sections which are reduced in diameter. In FIG. 6, the armature discs 150 are upwardly biased by volute springs 152 which engage in the disc underside and are supported on the upper front faces of the coil formers 142, 144.

The coil formers 142, 144 are fixedly inserted in recesses 154, 156 in a bottom wall 158 of the housing 128, for example by way of welding, gluing or a press fit. Stop collars 160 of the guide pins 136, 138 define the upper end position of the frame 134. In the zone of the stop collars 160, the bottom wall 158 has ports 162 which surround the stop collars with a clearance.

Deflection pulleys 166, 168 are mounted without axial play in side walls 164 of the frame 134 at the ends thereof. The deflection pulleys 166, 168 have a wide circumferential groove 170, in which an endless belt 172 is received without transversal play. The depth of the circumferential groove 170 is somewhat less than the thickness of the endless belt 172.

The working strand 176 of the endless belt 172, which is adjacent to the drawing table 10 and a drawing paper 174 mounted thereon, passes over a supporting plate 178 provided with a guide groove 180. The width of the latter has been so dimensioned that the endless belt 172 is received therein with a very limited transversal sliding play. The depth of the guide groove 174 is again less than the thickness of the endless belt 172. The supporting plate 178 also consists of a plastics material of low friction.

The endless belt 172 is substantially rigid in the transversal direction and has an external surface which has a high coefficient of friction on the drawing table 10 or the drawing paper 174. This can be brought about, for example, in that a flexible steel band is used as the endless belt 172 which is provided with a surface layer consisting of rubber or a soft plastics material.

In FIG. 6, there is furthermore shown a cover 182 of the housing 128, which cover carries the input unit 88 not shown in FIG. 6. The computing circuit 86 and a power stage for selecting the various windings 148 are furthermore accommodated in the housing 128.

It would seem to be sufficiently evident from the above description of the construction of the direction brakes 130 and 132 that upon the excitation of the windings 148 the relatively large surface of the working strand 176 of the endless belt 172 is brought into adhesive contact with the drawing table 10 or the drawing paper 174. Because of the size of the contact surface, it is then virtually impossible for the housing 128 to move in the direction of braking. By contrast, the housing 128 can still be slightly moved in the longitudinal direction of the working strand 176.

If a part of the drawing paper 174 is disposed beneath the working strand 176, then the normal force exerted on the working strand 176 will simultaneously cause the adhesive friction between the drawing paper 174 and the drawing table 10 to be increased over a relatively large area so that the fastening means for the drawing paper 174 are not appreciably stressed when the housing 128 is braked.

In the braking device shown in FIG. 4, the direction brakes 130 and 132 were accommodated in a housing 128 which is secured laterally to the guide block 30. This method of attachment was chosen with a view to providing a clear illustration and simple description of the braking device; it is not ideal inasmuch as a small portion of the drawing area near the left-hand edge of the drawing table 10 cannot be utilised unless one changes the position of the guide block 30 on the guide rail 28.

In practice, it is therefore to be preferred if the direction brakes 130 and 132 are integrated in the underside of the guide block 30 and the input unit 88 is fitted on the top of the guide block 30. This arrangement is also more advantageous inasmuch as, when the direction brakes 130 and 132 are engaged, relatively small torques are exerted on the guide block 30.

I claim:

1. A programmable braking device for a guide block that serves to move the drafting head of a drafting machine, which comprises:
   (a) at least one sensor that senses the actual coordinate position of the guide block,
   (b) an input unit for inputting the desired coordinate position of the guide block,
   (c) a computing circuit to which the output signals emitted by the sensor of (a) and the input unit of (b) are applied and which provides an output signal if the actual position of the guide block is identical with the desired position of the guide block,
   (d) a servo-braking device interconnected with said guide block which servo-braking device is activated by the output signal emitted by said computing circuit to thereby lock the guide block against further movement,
   (e) draw means that move around pulleys,
   (f) said draw means that move around pulleys being connected to said guide block, and
   (g) said servo-braking device being positioned close enough to said draw means that move around pulleys so that there is engagement thereof when the guide block is to be locked against further movement.

2. A braking device as set forth in claim 1 wherein the braking device (2) comprises braking units (70, 74 and 72, 76; 44, 54 and 46, 58) which are provided at the lateral ends of the displacement path of the guide block (18; 30).

3. A braking device as set forth in claim 2 wherein the draw means (60; 42) is belt-shaped and in that the braking units comprise brake shoes (44, 46, 70, 72) which, in the desired co-ordinate direction, are movable radially from the outside towards that section of the draw means (60; 42) which is on the adjacent pulley (38, 40, 62, 64).

4. A braking device as set forth in claim 3 wherein the brake shoes (44, 46, 70, 72) are provided with a partly cylindrical friction surface (50; 108).

5. A braking device as set forth in claim 2 or 3 which contains lateral guide plates (48) for the brake shoes (44, 46, 70, 72), between which the latter are displaceable in a close sliding fit.

6. A braking device as set forth in any one of claims 2 or 3 wherein the brake shoes (44') are made of a magnetisable material and carry a magnetic coil (104), and in that the guides (20, 22, 48) for the brake shoes (44) are made of a non-magnetisable material and the draw means (42) and/or the adjacent pulley (38) is/are made of a magnetisable material.

7. A braking device as set forth in any one of claims 2 or 3 wherein at least one pulley (38 or 40; 62 or 64) is connected to a transmitter (78–84).

8. A programmable braking device for a guide block that serves to move the drafting head of a drafting machine over a drafting table, which comprises:
   (a) at least one sensor that senses the actual coordinate position of the guide block,
   (b) an input unit for inputting the desired coordinate position of the guide block,
   (c) a computing circuit to which the output signals emitted by the sensor of (a) and the input unit of (b) are applied and which provides an output signal if the actual position of the guide block is identical with the desired position of the guide block,
   (d) a servo-braking device interconnected with said guide block, which servo-braking device is activated by the output signal emitted by said computing circuit to thereby lock the guide block against further movement,
   (e) said servo-braking device comprising a brake anchor plate (128) which is rigidly connected to the drafting head carrier (3) and which carries at least one part (172) which revolves around an axis that is parallel to one co-ordinate direction, and a drive (148, 150) for moving this part (172) in the direction that is vertical to the drawing table (10) and which has a braking position which is in frictional contact with the drawing table (10).

9. A braking device as set forth in claim 8 wherein said revolving part is a wheel which is equipped with a soft tire and is mounted on the brake anchor plate by an axial/radial bearing.

10. A braking device as set forth in claim 8 wherein the revolving part is an endless belt (172) which revolves around pulleys (116, 168) the axes of which are parallel to the drawing plane and vertical to the desired co-ordinate direction.

11. A braking device as set forth in claim 10 wherein the endless belt (172) is substantially rigid in the transverse direction and, with its working strand (176) that is directed towards the drawing table (10), is guided between the walls of a guide groove (180) in a supporting plate (178).

12. A braking device as set forth in claim 11 wherein the supporting plate (178) consists of a low-friction material on the material of the endless belt (172).

13. A braking device as set forth in claims 11 or 12 wherein the endless belt (172) is guided in a guide groove (170) in the pulley (166, 168).

14. A braking device as set forth in claims 1 or 7 wherein the drive comprises two electromagnets (148, 150), the coil formers (144) of which are simultaneously designed as guide bushes (140) for guide pins (136, 138) which are integrally formed with the frame (134) for the pulleys (166, 168) and are made of a non-magnetic material and which, at their free ends, carry an armature (150) consisting of a magnetisable material.

15. A braking device as set forth in claim 14 wherein the disc-shaped armature (150) and the coil former (144) front face adjacent thereto there is provided with a volute spring (152), by means of which the frame (134) which carries the pulleys (166, 168) is biased to the retracted position of rest.

16. A braking device as set forth in claim 8 wherein there are provided for both co-ordinate directions closed endless belts and associated deflection pulley sets and frame adjusting drives, characterized in that the brake anchor plate (128) is simultaneously designed as a housing for the input unit (88) and the computing circuit (86).

17. A braking device as set forth in claim 8 wherein the brake anchor plate is formed by the guide block (30) which carries the drafting head (32).

* * * * *